US011226831B2

(12) United States Patent
Lee et al.

(10) Patent No.: US 11,226,831 B2
(45) Date of Patent: Jan. 18, 2022

(54) CUSTOMIZING CONTENT BASED ON PREDICTED USER PREFERENCES

(71) Applicant: Facebook, Inc., Menlo Park, CA (US)

(72) Inventors: Chiwei John Lee, Canton, MI (US); Mark Gerard D'Arcy, New York, NY (US); Christopher William Jones, Mill Valley, CA (US)

(73) Assignee: Facebook, Inc., Menlo Park, CA (US)

( * ) Notice: Subject to any disclaimer, the term of this patent is extended or adjusted under 35 U.S.C. 154(b) by 14 days.

(21) Appl. No.: 15/369,547

(22) Filed: Dec. 5, 2016

(65) Prior Publication Data
US 2018/0157499 A1      Jun. 7, 2018

(51) Int. Cl.
*G06F 9/44*       (2018.01)
*G06F 3/0484*     (2013.01)
*G06N 20/00*      (2019.01)
*H04L 29/08*      (2006.01)
*G06F 9/451*      (2018.01)
*G06Q 50/00*      (2012.01)

(52) U.S. Cl.
CPC .......... *G06F 9/451* (2018.02); *G06F 3/04847* (2013.01); *G06N 20/00* (2019.01); *G06Q 50/01* (2013.01)

(58) Field of Classification Search
CPC ... H04L 67/306; G06F 9/451; G06F 3/04847; G06N 20/00; G06Q 50/01
See application file for complete search history.

(56) References Cited

U.S. PATENT DOCUMENTS 9,499,385 B1 * 11/2016 Studor ................. B67D 3/0003
2002/0019749 A1 * 2/2002 Becker ................. G06F 19/325
                                                            705/2

(Continued)

FOREIGN PATENT DOCUMENTS

GB     2536565 A  *  9/2016  ............. G06F 17/50
JP   2001297233 A    10/2001

(Continued)

OTHER PUBLICATIONS

Rodriguez et al. "Color Recommendation System Combining Design Concepts with Interactive Customers Preference Modeling from Context Changes", pp. 1-8, pub. 2010 (Year: 2010).*

(Continued)

*Primary Examiner* — Stephen S Hong
*Assistant Examiner* — Ahamed I Nazar
(74) *Attorney, Agent, or Firm* — BakerHostetler

(57) ABSTRACT

A system provides content describing an object, for example, a physical object or a customizable service. The system presents an interactive user interface displaying a customized version of a physical object. The interactive user interface allows the user to further customize the physical object. The user interface displays a plurality of options for customizing various components of the physical object. The system customizes the physical object presented via the interactive user interface based on the user profile and user interactions of the user with other users via an online system. The system allows the user to further customize the physical object via the interactive user interface. The interactive user interface presents various options for customization of the physical object based on predicted user preferences.

20 Claims, 7 Drawing Sheets

(56) References Cited

U.S. PATENT DOCUMENTS

| | | | |
|---|---|---|---|
| 2007/0078849 A1 | 4/2007 | Slothouber | |
| 2008/0295011 A1* | 11/2008 | Bhogal | G06F 9/451 715/765 |
| 2010/0094774 A1* | 4/2010 | Jackowitz | G06Q 40/00 705/36 R |
| 2010/0185309 A1* | 7/2010 | Ohiaeri | G06Q 30/0621 700/98 |
| 2010/0262556 A1* | 10/2010 | Shaya | G06Q 30/0254 705/347 |
| 2011/0137758 A1* | 6/2011 | Bienias | G06Q 30/0643 705/27.2 |
| 2012/0089666 A1* | 4/2012 | Goswami | G06Q 10/103 709/203 |
| 2012/0231438 A1* | 9/2012 | Fakhrai | G09B 7/00 434/350 |
| 2012/0290433 A1 | 11/2012 | England et al. | |
| 2013/0054362 A1* | 2/2013 | Ross | G06Q 40/02 705/14.53 |
| 2013/0173415 A1* | 7/2013 | Harvill | G06Q 30/0641 705/26.5 |
| 2014/0222547 A1* | 8/2014 | Pridmore | G06Q 30/02 705/14.39 |
| 2015/0154322 A1* | 6/2015 | Fonte | H04N 5/23219 351/178 |
| 2015/0324366 A1* | 11/2015 | Becker | G06F 16/313 707/706 |
| 2015/0379000 A1* | 12/2015 | Haitani | G06F 16/58 707/745 |
| 2016/0063595 A1 | 3/2016 | Oral et al. | |
| 2016/0098783 A1 | 4/2016 | Margalit | |
| 2017/0270620 A1* | 9/2017 | Haitani | G06Q 50/01 |
| 2018/0247356 A1* | 8/2018 | Thompson | G06N 5/022 |

FOREIGN PATENT DOCUMENTS

| | | |
|---|---|---|
| JP | 2002015183 A | 1/2002 |
| JP | 2002238036 A | 8/2002 |
| JP | 2003296613 A | 10/2003 |
| JP | 2009193498 A | 8/2009 |
| JP | 2013511210 A | 3/2013 |
| JP | 2015064891 A | 4/2015 |
| JP | 2016537716 A | 12/2016 |
| KR | 10-0652299 B1 | 11/2006 |
| KR | 10-2016-0079299 A | 7/2016 |
| WO | WO 2007/024736 A2 | 3/2007 |
| WO | 2011059846 A1 | 5/2011 |
| WO | WO 2016/135659 A1 | 9/2016 |

OTHER PUBLICATIONS

PCT International Search Report and Written Opinion, PCT Application No. PCT/US2017/062058, dated Mar. 14, 2018, fifteen pages.

The European Patent Office, Extended European Search Report, European Patent Application No. 17878795.8, dated Nov. 20, 2019, eight pages.

* cited by examiner

CUSTOMIZING CONTENT BASED ON PREDICTED USER PREFERENCES

BACKGROUND

This disclosure relates generally to customization of content and more specifically to providing content describing a customizable object and user interfaces for further customizing the object based on social information of a user.

Online systems receive content from content publishers and send the content to users of the online system. Content provided by a content publisher may describe a topic, an object, or an entity associated with the content publisher. For example, a content publisher associated with a manufacturer of certain object may provide content describing the objects to the online system. A content publisher may specify criteria describing attributes of a user that should be provided with a certain content item.

Online systems attempt to send content items to users that are likely to interact with the content items. Traditional content items are limited in terms of the degree of customization to the user that is possible. If users of an online system do not find content items received from the online system interesting or specific to their interests, the users are unlikely to interact with the content items. Accordingly, if the online system provides content to users that they are not interested in, the online system provides a poor user experience. If an online system provides poor user experience, the online system is likely to lose its user base. Furthermore, fewer content publishers are likely to use the online system for providing their content to users.

SUMMARY

An online system, such as a social networking system, provides content to a user describing a physical object customized based on social information describing the user. Social information describing a user includes, for example, the user's profile information, interactions with the online system, and connections to other users and entities. Examples of a customizable physical object include a car or a computer. The customizable physical object comprises customizable features. For example, a car has customizable features including the color of the car, the type of transmission of the car (automatic or manual), wheel style, and so on. The online system determines values for various customizable features that the user is likely to be interested in based on social information of the user.

In an embodiment, the online system further provides an interactive user interface for customizing a physical object. The interactive user interface is configured based on social information describing the user. The interactive user interface includes widgets for customizing specific features of the physical object. For example, a user interface for customizing a car may include a drop down list for selecting a color for the car, a button for selecting whether the car has automatic transmission or manual transmission, and so on. The online system configures a widget for customizing a feature based on the predicted user preferences. For example, the online system presents the user with customization options for the physical object that a machine learning model predicts are most likely to appeal to the user.

According to an embodiment, the online system trains machine learning models to predict which customizable option for a feature of the physical object a particular user or group of similar users is likely to prefer. The online system extracts features based on user profile information of the user including the user's life stage, age, occupation, income, and lifestyle. The features are provided to the machine learning models which use them to generate metadata that indicates which types of physical objects and which customizable or configurable options for those physical objects the user is most likely to prefer.

In an embodiment, the online system configures content for displaying the physical object to the user, such that the initial view of the physical object is provided according to the predicted user preferences in the metadata. The online system then also presents the interactive user interface with options to further customize the physical object. The interactive user interface presents options for customizing each feature. Options displayed most prominently to the user for customization are those options that the metadata predicts will be the most interesting to the user. The online system sends data and metadata with information describing how to display the customized interactive user interface to a client device. The client device presents the content item showing the customized physical object and the customized interactive user interface to the user.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Overall System Environment

Figure 1:
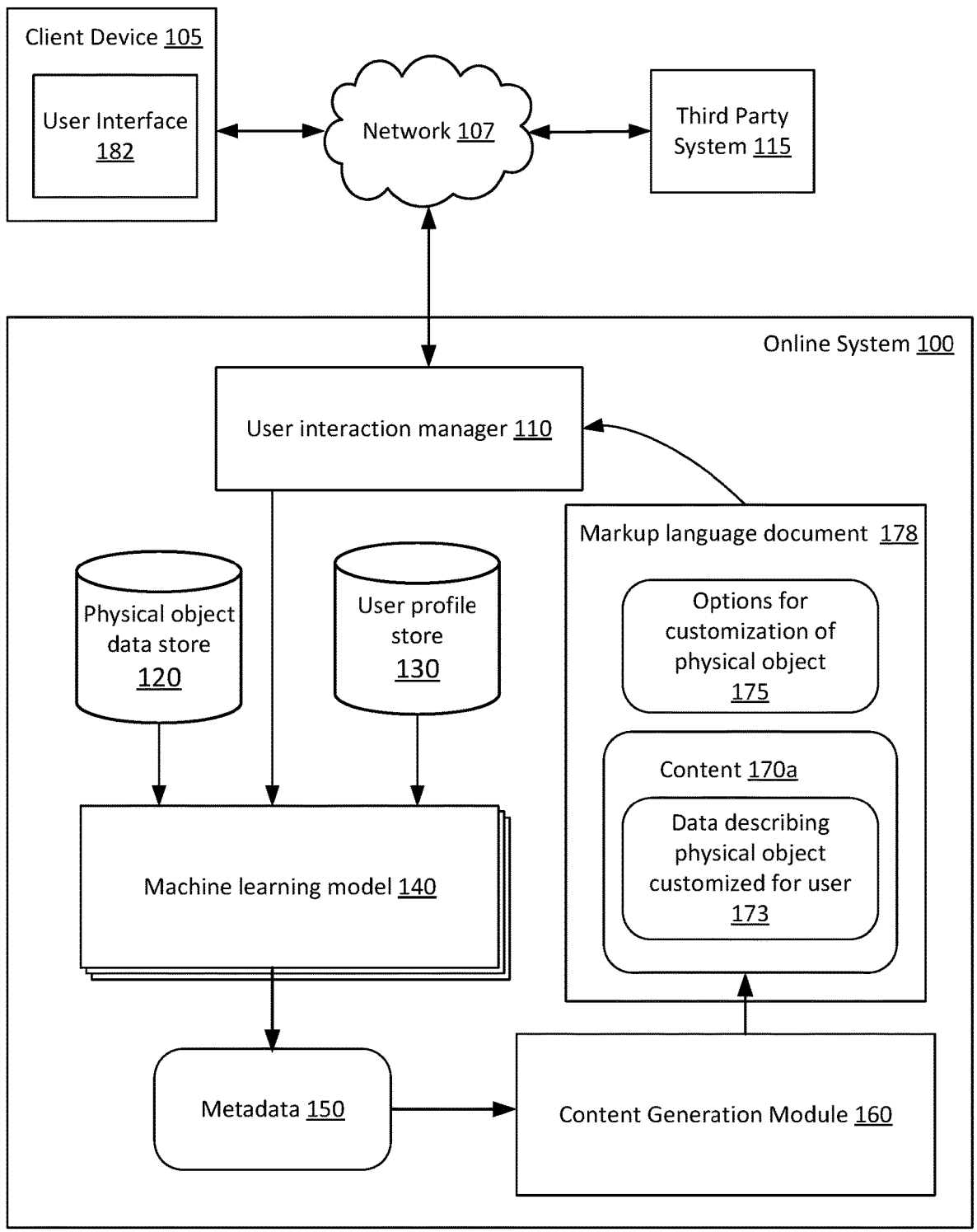
FIG. 1 is a block diagram of a system environment in which an online system operates, in accordance with an embodiment.

FIG. 1 is a block diagram of a system environment for an online system 100. The system environment shown by FIG. 1 comprises one or more client devices 105, a network 107, and the online system 100. In alternative embodiments, different and/or additional components may be included in the system environment. The embodiments described herein can be adapted to social networking systems.

A client device 105 is a computing device capable of receiving user input and transmitting and/or receiving data via the network 107. In one embodiment, a client device 105 is a conventional computer system, such as a desktop or a laptop computer. Alternatively, a client device 105 may be a device having computer functionality, such as a personal digital assistant (PDA), a mobile telephone, a smartphone or another suitable device. A client device 105 is configured to communicate via the network 107. In one embodiment, a client device 105 executes an application allowing a user of the client device 105 to interact with the online system 100. For example, a client device 105 executes a browser application to enable interaction between the client device 105 and the online system 100 via the network 107. In another embodiment, a client device 105 interacts with the online system 100 through an application programming interface (API) running on a native operating system of the client device 105, such as IOS® or ANDROID™.

The client devices 105 are configured to communicate via the network 107, which may comprise any combination of local area and/or wide area networks, using both wired and/or wireless communication systems. In one embodiment, the network 107 uses standard communications technologies and/or protocols. For example, the network 107 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 107 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 107 may be represented using any suitable format, such as hypertext markup language (HTML) or extensible markup language (XML). In some embodiments, all or some of the communication links of the network 107 may be encrypted using any suitable technique or techniques.

One or more third party systems 115 may be coupled to the network 107 for communicating with the online system 100, as further described below in conjunction with FIG. 2. A third party system 115 may be an application provider communicating information describing applications for execution by a client device 105. A third party system 115 may communicate data to client devices 105 for use by an application executing on the client device 105. In some embodiments, a third party system 115 provides content or other information for presentation via a client device 105. A third party system 115 may also communicate information to the online system 100, such as content, or information about an application provided by the third party system.

The online system 100 further comprises a user interaction manager 110, a physical object data store 120, a user profile store 130, machine learning models 140, metadata 150, a content generation module 160, and content 170a. The content 170 may be sponsored content, for example, an advertisement.

FIG. 1 and the other figures use like reference numerals to identify like elements. A letter after a reference numeral, such as "170a," indicates that the text refers specifically to the element having that particular reference numeral. A reference numeral in the text without a following letter, such as "170," refers to any or all of the elements in the figures bearing that reference numeral, e.g., "170" in the text refers to reference numerals "170a" and/or "170b" in the figures.

According to an embodiment, the content 170 further comprises data to display a physical object 173 in a configuration customized for a user. In an embodiment, the content 170 is presented via a user interface 178 configured to allow a user to further customize the physical object. In an embodiment, the metadata 150 generated based on the machine learning models comprises options 175 for customization of the physical object. In an embodiment, the online system 100 generates a markup language document 178 for configuring a user interface 182 for display on the client device 105. The user interface 182 displays one or more widgets for receiving a selection of a value for customization of the physical object. For example, the options 175 for customization of the physical object may include the color of the physical object. The user interface 182 may present a widget, for example, a drop down list of various colors allowing a user to provide a selection of a color. The online system 100 selects the colors presented in the drop down list of the user interface 182 based on user profile information or social information of the user.

The user interaction manager 110 configures the user interface 182 for presentation to users of the online system 100. The user interface 182 may be configured by mechanisms other than a markup language document 178, for example, using serialized objects that store metadata describing the user interface elements. The user interfaces 182 may be presented via an application executing on the client devices 105. The user interaction manager 110 also receives user interactions from users via the user interface 182. According to one embodiment, the user interaction manager 110 stores past interactions users have with the online system 100 in a log.

The physical object data store 120 stores information about physical objects, and particularly objects or collections of objects that can be customized by changing variables or values that correspond to various components or configurations of the physical object. A customizable physical object has one or more customizable features. For example, a car is a customizable physical object that has customizable features including color, type of transmission (manual or automatic), whether the car has a sunroof, whether the car has cruise control, wheel style, paint color decals, side moldings, engine models, floor mats, and security systems. A customizable feature may be a property of the customizable physical object, for example, the color of the car. A customizable feature may be a property of a component of the customizable physical object, for example, the transmission of a car. A customizable feature may represent whether a component is present in the customizable physical object, for example, whether a car has a DVD player. A customizable feature may represent an arrangement of various components of the customizable physical object. Each customizable feature can take one of a plurality of values. For example, the color of a car can take one of several values including white, black, green, and so on. Similarly, the transmission type can be either manual or automatic. An instance of a customizable physical object has a specific value of each customizable feature. According to an embodiment, the physical object data store 120 comprises information about the physical object as a whole as well as information about variations of the physical object. Other examples of customizable physical objects include computer towers, laptop computers, shoes, cell phones, apartment layouts, kitchen remodels, and stereo systems. For example, a laptop computer has various customizable features such as size of memory, size of disk, screen resolution, size of screen, and so on.

The user profile store 130 stores information about users of the online system 100. The user profile store 130 comprises user-provided data such as a user's name, date of birth, and age. The user profile store 130 may also include user preferences like hobbies, favorite books, favorite movies, favorite artists, and favorite color. According to an embodiment, the user profile store 130 further comprises information that the online system 100 has previously inferred about the user.

According to an embodiment, user interaction data from the user interaction manager 110, data from the physical object data store 120, and data from the user profile store 130 is provided as input to one or more machine learning models 140. The online system 100 uses the machine learning models 140 to generate metadata 150 used for customization of the physical objects and for customization of user interface 182. In an embodiment, a machine learning model 140 determines a score indicative of a likelihood that a feature of a physical object is of interest to a user. The online system 100 uses the machine learning models 140 to identify characteristics and configurations of the physical object that are likely to be appealing to the user, based on the user's preferences, user profile information, and social information. In an embodiment, a machine learning model 140 is used to predict the user preference for a customizable aspect of the physical object. In some embodiments weighted aggregations of feature values may be used to predict user preferences for certain configurations of the physical object instead of or in conjunction with the machine learning models 140. In some embodiments, the online system 100 determines preferences for groups of similar users rather than for individual users, for example, a group of users sharing a demographic attribute.

The online system 100 generates metadata 150 based on the machine learning model 140. The metadata describes various features of the physical object that are likely to be of interest to a particular user (or a group of users having particular demographic attributes). The metadata can include information about what types of widgets to use, the ideal type and configuration of the physical object that is first presented to the user in the user's newsfeed, and/or the order in which the user is presented with customization options.

As an example, the physical object represents a car. The online system 100 identifies the attributes or features of the car that the user is likely to be interested in further customizing based on the user profile information and social information of the user. For example, the online system 100 determines whether the user should be presented with the option to customize the color of the car, or the option to customize the wheels of the car. The online system 100 determines the attributes or features of the car that are initially presented to the user as part of a content item 170. For example, the online system 100 presents a specific color of the car based on the user profile information and social information of the user. For example, the online system 100 may determine based on the user profile and social information that the user is interested in outdoor activities. Based on historical data of users with matching interests, the online system determines that an initial view for customizing car colors could display neutral color options like tan and silver since these colors hide dirt. The online system 100 further determines other options for the color of the car, for example, red and blue, to be made available for further customization by the user. The online system 100 determines, based on historical data of matching users, various colors of cars that similar users have shown interest in and ranks these colors based on a score predicted by the machine learning model 140, the score indicating a likelihood of the user being interested in a color. The online system 100 presents a widget, for example, a drop down list listing these colors ranked based on the score determined by the machine learning model 140.

The content generation module 160 uses the metadata 150 to develop content for displaying to the user. In one embodiment, a computer system automatically customizes an image of the physical object and a series of customization interaction interfaces, according to the user preferences recommended by the metadata 150. In another embodiment, an expert uses the information about user preferences provided in the metadata 150 to build content representing a configuration of the physical object and customization options of the physical object manually, or with the aid of a computer system.

The content generation module 160 outputs content 170 data for the user interaction manager 110 to display to the user. According to an embodiment, the content 170 comprises data to display the physical object in an optimized configuration 173 according to the user preferences that were determined by the machine learning models 140. The data to display the physical object in an optimized configuration 173 comprises instructions for the user interaction manager 110 about what information and which images related to the physical object should be initially displayed to the user. For example, if the online system 100 determines based on social interactions that a user is a new mother, the online system 100 may determine based on the machine learning model 140, that the user is likely to be interested in a silver minivan and send content showing such a vehicle in her newsfeed. In contrast, the online system 100 may determine based on the stored user profile information and social information of a user that the user likes fast cars and accordingly send a red sports car as content 170 to the user.

The content 170 further comprises data to display options for customization of the physical object 175. A user interface generation module 375 (shown in FIG. 3) generates a markup language document 178 that includes instructions for the interaction manager 110 specifying how to display an interactive interface to the user through which the user can further customize a version of the physical object that was shown in an optimized configuration via content 170 that may be delivered via the news feed. According to an embodiment, the markup language document 178 specifies the layout of the user interface, information about which variables and attributes the customer should be allowed to customize through the interface, information about available customization options for various attributes of the physical object, and links to additional information about the physical object or purchasing options.

In some embodiments the various modules shown as part of the online system 100 in FIG. 1 may be stored and executed in different systems. For example, the content generation module 160 may be executed by a third party system 115 different from the online system 100. Accordingly, the third party system 115 receives social information describing the user from the online system 100 via the network 107 and generates the content item 170 and the markup language document 178 for presenting to a user via the client device 105.

User Interface

Figure 2A:
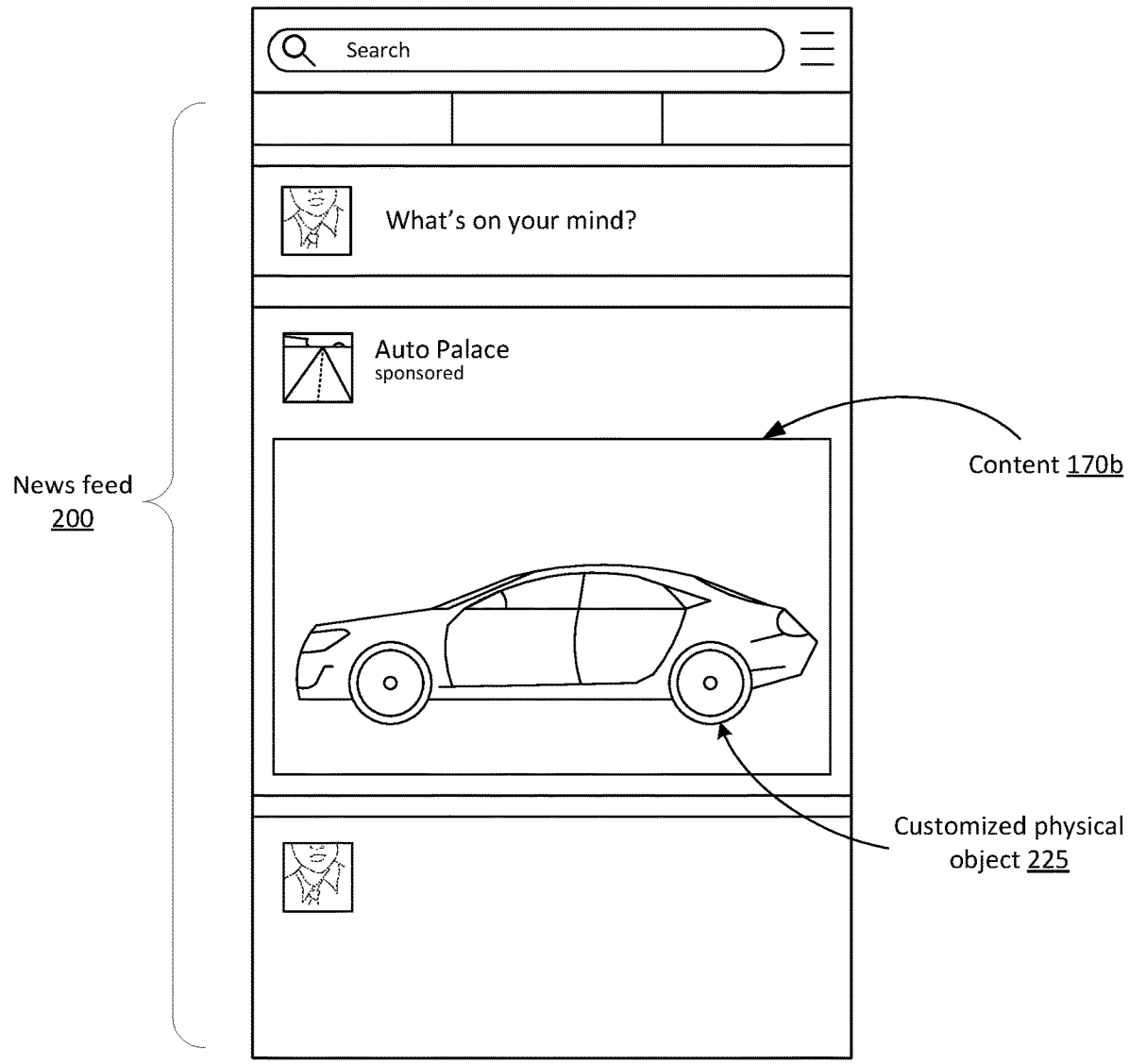
FIG. 2A is a user interface displaying content in a mobile news feed, in accordance with an embodiment.

FIG. 2A is a user interface displaying content in a mobile news feed 200, in accordance with an embodiment. The example given in FIG. 2A shows one embodiment in which content 170*b* comprises an image or a video showing a customized physical object 225. The customized physical object 225 in the example shown in FIG. 2A is a car. The online system 100 identifies customizable and configurable features of the car that are likely to be of interest based on user profile data and social interactions of the user. For example, if the online system 100 has determined that the user has a family with kids, the online system 100 includes family friendly features in the car presented in the customized physical object image 225. The news feed 200 presents the content 170b in conjunction with a widget that allows the user to navigate to an interactive user interface in which the user can further customize the physical object, according to one embodiment. For example, the content 170b may be associated with a link to a uniform resource location (URL) that directs the user to a website that provides the interactive user interface. The example of FIG. 2A shows a mobile news feed, but the content 170b can be provided to the user in a variety of contexts, such as along a right or left hand side of a page in an advertisement slot, as a banner ad, as a full page ad overlay, in a desktop news feed amongst other news items, among other locations.

Figure 2B:
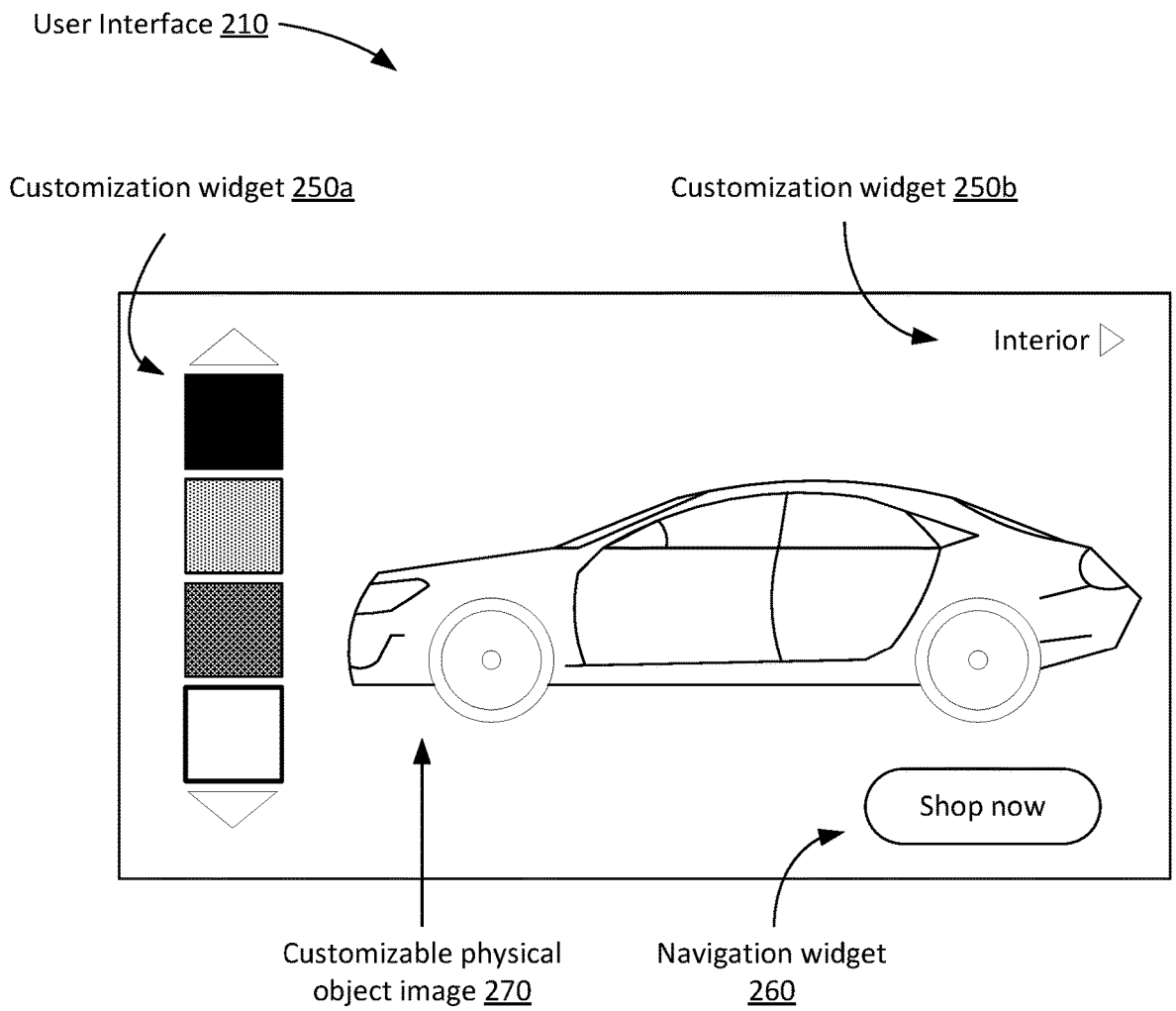
FIG. 2B is an interactive user interface that allows for user customization of the physical object, in accordance with an embodiment.

FIG. 2B is an interactive user interface that allows for user customization of the physical object, in accordance with an embodiment. The example shows one possible view of a customization experience provided to the user by the system, for example by clicking on the content 170b. i.e., image of the customized physical object 225 in the newsfeed 200. This interactive user interface can be presented on a separate page to which the user navigates by clicking on the content 170b, presented as an overlay over the current page with the content 170b, presented on a split screen side-by-side or above or below the content 170b of the current page, etc.). FIG. 2B shows an example user interface presented by the online system 100 to the user for customizing a car. The image of the customizable physical object 270 appears in the view. In the example, the interactive user interface 210 allows the user to choose and change the color of the car in the image with a customization widget 250a. According to an embodiment this customization widget 250a, or a similar widget, displays customization options that the metadata 150 has provided as those options determined by the online system 100 based on the machine learning model 140 as the options most likely to be of interest to the user. For example, the user interface 210 displays the car with an initial color option selected based on the user's favorite car colors, as predicted by the machine learning models 140. The interactive user interface 210 further provides other color options determined to be the top few favorite color options of the user as predicted by the machine learning models 140 upon further navigation by the user, for example, using customization widget 250a. In an embodiment, the interactive user interface 210 presents the values of the top few options of a customizable feature of the car in an order based on a score for each value by the machine learning model 140. For example, the interactive user interface 210 may present values that were ranked higher by the machine learning model 140 more prominently, for example, above the lower ranked values. Similarly, the interactive user interface 210 presents customizable widgets in an order determined by a score for each feature determined by the machine learning model 140, the score indicating a level of interest of the user in the customizable feature. For example, the machine learning model 140 may predict that a user with a family with kids is more likely to be interested in family related features such as a DVD player in the car. Accordingly, customization widgets for customizing such features are displayed more prominently, for example, at the top of the interactive user interface 210 or on the first screen of the interactive user interface 210. In accordance with an embodiment, the interactive user interface 210 further comprises additional widgets such as a navigation widget 260 for navigating to an external website associated with the car.

The customization widget 250b of FIG. 2B allows the user to switch to an interactive customization view in which the user can customize other configurable aspects of the physical object. For example, in addition to selecting an exterior car color the user can interact with customization options for the car interior in another view. The navigation widget 260 allows the user to navigate to additional content beyond the interactive customization interface, according to one embodiment. For example the navigation widget 260 may be a "shop now" button that provides a link to a webpage where the user can purchase the customized version of the physical object, or similar items. As another example the navigation widget 260 may be a "register" button that provides a link to a webpage where the user can register with a website associated with the customizable physical object 225 shown in the content 170.

System Architecture

Figure 3:
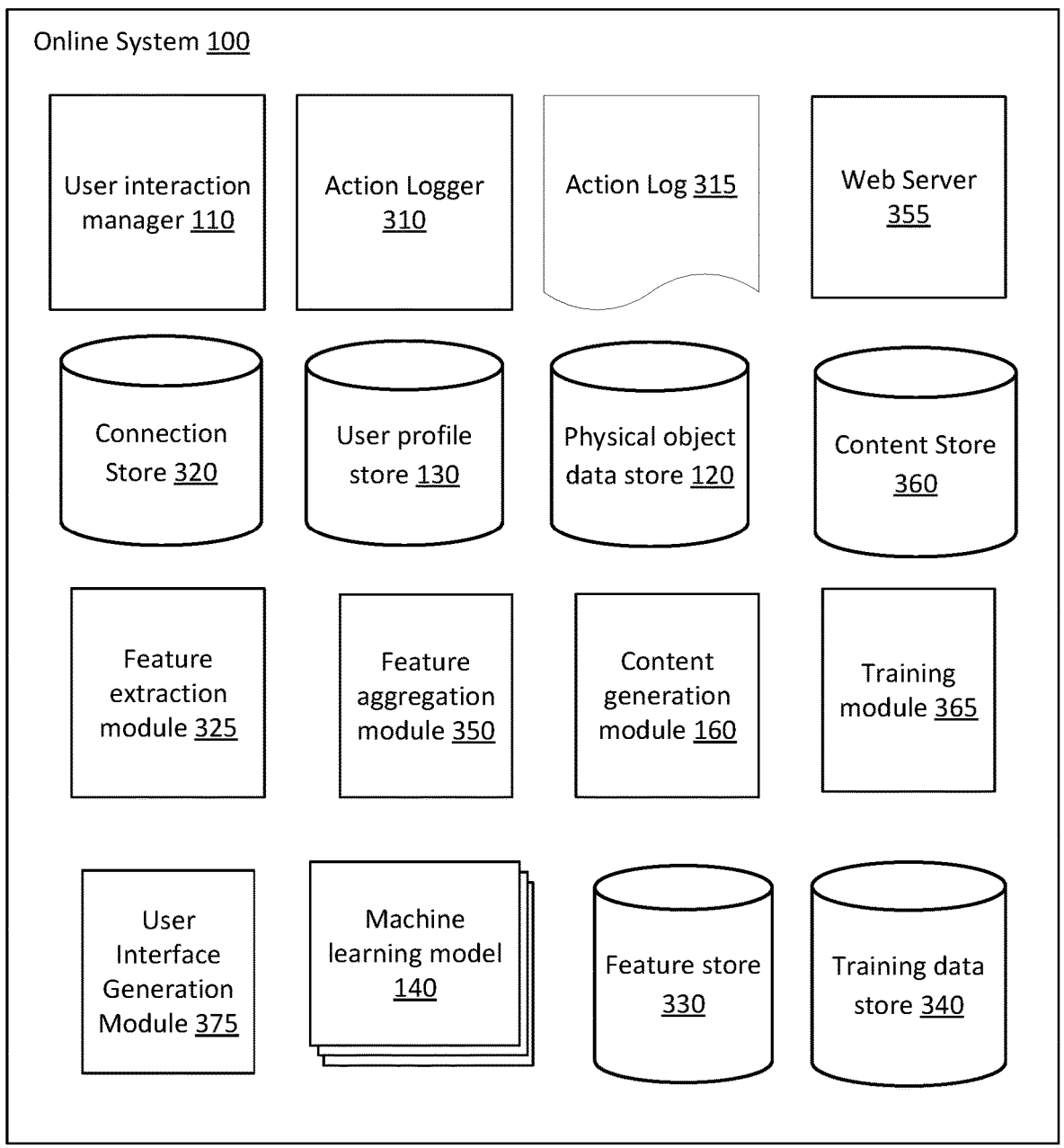
FIG. 3 is a block diagram of an online system, in accordance with an embodiment.

FIG. 3 is a block diagram of an architecture of the online system 100. The online system 100 shown in FIG. 3 includes a user interaction manager 110, an action logger 310, and action log 315, a connection store 320, a user profile store 130, a physical object data store 120, a feature store 330, a training data store 340, a feature extraction module 325, a machine learning module 120, a feature aggregation module 350, a web server 355, a training module 365, a user interface generation module 375, and a content generation module 160. In other embodiments, the online system 100 may include additional, fewer, or different components for various applications. Conventional components such as network interfaces, security functions, load balancers, failover servers, management and network operations consoles, and the like are not shown so as to not obscure the details of the system architecture.

A user of the online system 100 is typically associated with a user profile, which is stored in the user profile store 130. A user profile includes declarative information about the user that was explicitly provided by the user to the online system 100 and may also include user profile information inferred by the online system 100. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system 100 users displayed in an image, with information identifying the images in which a user is tagged or stored in the user profile of the user. A user profile in the user profile store 130 may also maintain references to actions by the corresponding user performed on content items in a content store and stored in the action log 315.

While user profiles in the user profile store 130 are frequently associated with individuals, allowing individuals to interact with each other via the online system 100, user profiles may also be stored for entities such as businesses or organizations (e.g., brand page). This allows an entity to establish a presence on the online system 100 for connecting and exchanging content with other online system users. The entity may post information about itself, about its products or provide other information to users of the online system 100 using a brand page associated with the entity's user profile. Other users of the online system 100 may connect to the brand page to receive information posted to the brand page or to receive information from the brand page. A user profile associated with the brand page may include information about the entity itself, providing users with background or informational data about the entity.

The content store 360 stores objects that represent various types of content. The content store 360 stores content items 170 that show the customizable physical object 225. Other examples of content stored in content store 360 include a page post, a status update, a photograph, a video, a link, a shared content item, a gaming application achievement, a check-in event at a local business, a brand page, or any other type of content. Online system users may create objects stored by the content store 360, such as status updates, photos tagged by users to be associated with other objects in the online system 100, events, groups or applications. In some embodiments, objects are received from third-party applications or third-party applications separate from the online system 100. In one embodiment, objects in the content store 210 represent single pieces of content, or content "items."

The action logger 310 receives communications about user actions internal to and/or external to the online system 100, populating the action log 315 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 315.

The action log 315 may be used by the online system 100 to track user actions on the online system 100, as well as actions on third party systems that communicate information to the online system 100. Users may interact with various objects on the online system 100, and information describing these interactions is stored in the action log 315. Examples of interactions with objects include: commenting on posts, sharing links, checking-in to physical locations via a client device 105, accessing content items, and any other suitable interactions. Additional examples of interactions with objects on the online system 100 that are included in the action log 315 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 315 may record a user's interactions with advertisements on the online system 100 as well as with other applications operating on the online system 100. In some embodiments, data from the action log 315 is used to infer interests or preferences of a user, augmenting the interests included in the user's user profile and allowing a more complete understanding of user preferences. For example, a user who contributes many posts or comments about hiking, biking, and rock climbing might be understood by the online system 100 to be someone who likes spending time outdoors.

The action log 315 may also store user actions taken on a third party system, such as an external website, and communicated to the online system 100. For example, an e-commerce website may recognize a user of a online system 100 through a social plug-in enabling the e-commerce website to identify the user of the online system 100. Because users of the online system 100 are uniquely identifiable, e-commerce websites, such as in the preceding example, may communicate information about a user's actions outside of the online system 100 to the online system 100 for association with the user. Hence, the action log 315 may record information about actions users perform on third party systems, including webpage viewing histories, advertisements that were engaged, purchases made, and other patterns from shopping and buying. Additionally, actions a user performs via an application associated with a third party system and executing on a client device 105 may be communicated to the action logger 310 by the application for recordation and association with the user in the action log 315.

In one embodiment, the connection store 320 stores information describing connections between users and other objects on the online system 100. Some connections may be defined by users, allowing users to specify their relationships with other users. For example, users may generate connections with other users that parallel the users' real-life relationships, such as friends, co-workers, partners, and so forth. Other connections are generated when users interact with objects in the online system 100, such as expressing interest in a page on the online system 100, sharing a link with other users of the online system 100, and commenting on posts made by other users of the online system 100.

In one embodiment, a connection may include various features each representing characteristics of interactions between users, interactions between users and objects, or interactions between objects. For example, features included in a connection describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 100, or data describing demographic information about the user. Each feature may be associated with a source object or user, a target object or user, and a feature value. A feature may be specified as an expression based on values describing the source object or user, the target object or user, or interactions between the source object or user and target object or user; hence, a connection may be represented as one or more feature expressions.

The connection store 320 also stores information about connections, such as affinity scores for objects, interests, and other users. Affinity scores, or "affinities," may be computed by the online system 100 to approximate a user's interest in an object or in another user in the online system 100 based on the actions performed by the user. A user's affinity may be computed by the online system 100 to approximate the user's interest in an object, in a topic, or in another user in the online system 100 based on actions performed by the user. Multiple interactions between a user and a specific object may be stored as a single connection in the connection store 320, in one embodiment. Alternatively, each interaction between a user and a specific object is stored as a separate connection. In some embodiments, connections between users may be stored in the user profile store 130, or the user profile store 130 may access the connection store 320 to determine connections between users. In one embodiment, users and objects are represented as nodes in a social graph, and connections between users or objects, or between a user and an object, are represented as edges connecting those nodes. Similarly, interactions between users or between users and objects can be represented as edges in the social graph.

The user interface generation module 375 configures user interfaces that are presented to users of the online system 100 (e.g. via a user application on the client device 105). For example, in an embodiment, the user interface generation module 375 may configure markup language documents 178 (e.g., HTML documents) as user interfaces. The user interface generation module 375 provides the generated user interfaces to the user interaction manager 110 that provides the user interfaces to the user via the client device 105. The user interaction manager 110 receives user interactions from users via the user interfaces. For example, the user interaction manager 110 may present a user interface providing various values of a feature of a customizable physical object and receives a user interaction selecting a particular value for the feature. According to an embodiment, the user interaction manager 110 additionally keeps a log of the interactions a user has with the online system 100.

The physical object data store 120 stores information about physical objects, particularly objects or collections of objects that can be customized by changing variables or values related to different parts of the physical object, according to an embodiment. The physical object data store 120 holds information about any variants of the general types of physical objects that are described within. It also includes information about which parts of a physical object are customizable and possible variations of some or all configurable or customizable components of the physical object, according to an embodiment. For example, the physical object data store 120 may hold information about which car models are available for customization. In that case, the physical object data store would further store details about all the customizable features of the different car models. To elaborate upon the example, each car in the physical data store 120 has various customizable or configurable components. For each car in the physical object data store 120, available variations of some or all of the customizable or configurable components such as wheel styles, fuel sources, paint colors, decals, side moldings, engine models, interior upholstery, and security systems are also stored.

The training data store 340 stores training data comprising user profiles, user interaction data, and user connections. The training data store 340 also associates input data with some indication of the likelihood that a user associated with a particular profile, interaction, or connection will prefer a certain customization option for a feature. Data to label the training data according to anticipated preferences may be provided by experts or may be based on historical data.

The training module 365 generates training data for the training data store 340 and trains the machine learning model 140. In an embodiment, the training module 365 presents sample data comprising a user profile and social information describing an input user and corresponding customizable physical object having a particular customizable feature to an expert and receives input describing whether the sample data represents a positive training data or a negative training data. A positive training data represents a customizable physical object with the customizable feature that is likely to be liked by a user matching the input user profile. A positive training data represents a customizable physical object with the customizable feature that is unlikely to be liked by a user matching the input user profile.

In another embodiment, the training module 365 processes past user interactions stored in action logs 315 to identify positive and negative training data. For example, if a past user interaction indicates that a user having a particular profile liked a customizable physical object with a particular feature, the training module 365 uses the sample data comprising user profile of the user and the customizable physical object with a particular feature as positive training data. Similarly, if past user interactions indicate that a user having a particular profile did not like a customizable physical object with a particular feature, the training module 365 uses the sample data comprising user profile of the user and the customizable physical object with a particular feature as negative training data. User interactions indicating the user liked a customizable physical object comprise performing one or more of these actions responsive to being presented with a content item showing the customizable physical object: requesting additional information, executing a transaction (for example, a purchase) associated with the customizable physical object, sharing information describing the customizable physical object, or registering with a website associated with the customizable physical object. User interactions indicating the user did not like a customizable physical object comprise, responsive to being presented with a content item showing the customizable physical object, the user ignoring the content item by not performing any user interaction, closing the content item, explicitly marking the content item as a disliked item by clicking on a dislike button, and so on.

The feature extraction module 325 extracts features that are required by the machine learning models 140 from various sources including user profiles, user interaction data, and user connections, according to an embodiment. While the machine learning models 140 are being trained, the feature extraction module 325 extracts features from training data in the training data store 340. When the machine learning models 140 are being used to predict user preferences, the feature extraction module 325 extracts features from the connection store 320, the user profile store 130, and the physical object data store 120, according to an embodiment.

The feature store 330 stores the features that are extracted by the feature extraction module 325. The features comprise information related to how users interact with the online system 100, connections on the online system 100, and user profile information. For example, the feature store 330 might store information about a user's life stage, interests, income, occupation, lifestyle, location, age, average commute, tendency to live in urban, suburban, or rural areas, preferences for luxury goods, and the like.

The machine learning models 140 are trained to provide a score or value (e.g. a Boolean or a score classifier) indicating a user's predicted preference for a particular feature variation. The machine learning models 140 are trained using features in the feature store 330 that are associated with a user's profile, connections, and interactions with the online system 100. According to one embodiment, a different model is trained for each configurable or customizable component of a physical object. For example, a set of machine learning models created to determine user preferences for variable components of a car might include a model for predicting what kind of car a user would like, a model trained to predict a user's color preference, a model for predicting whether a user would be interested in a car with a bike rack, etc.

In one embodiment, a machine learning model 140 receives information identifying a user and a customizable feature of a customizable physical object and generates a score indicative of the likelihood that the user would customize that specific feature when presented with the user interface 210. The user interface generation module 375 uses these machine learning models 140 to configure the user interface 210. For example, assume that the machine learning model 140 predicts that the user is more likely to customize a feature F1 compared to a feature F2. Accordingly, the user interface generation module 375 presents a widget W1 for customizing the feature F1 more prominently compared to a widget W2 for customizing feature F2 in the user interface 210. The user interface generation module 375 may present widget W1 more prominently compared to widget W2 by placing widget W1 above widget W2, or displaying widget W2 using a shape that is larger compared to the shape of widget W2, or by displaying widget W1 on a screen that appears before the screen showing widget W2 in a workflow.

In one embodiment, a machine learning model 140 receives information identifying a user and a value for a customizable feature of a customizable physical object and generates a score indicative of the likelihood that the user is likely to be interested in the input value for the input customizable feature. Accordingly, the user is most likely to select an input value of the customizable feature that has the highest score as predicted by the machine learning model when presented with a plurality of values for the customizable feature via the user interface 210. In an embodiment, the user interface generation module 375 selects the values for various customizable features that the user is most likely to be interested in based on the predictions of the machine learning model 140. The user interface generation module 375 generates a content item displaying a customizable physical object having the selected values of the customizable features and presents the content item via the user interface 210.

In one embodiment, the user interface generation module 375 configures the widgets of the user interface 210 based on the results of the machine learning model 140. For example, a widget may present a plurality of values of customizable features via the user interface 210 to a user to allow the user to select a value. For example, the user interface generation module 375 configures a widget for selecting a color for a car for presenting to a user as follows. The user interface generation module 375 determines a score for each color for the user using the machine learning model 140. The score indicates a likelihood that the user would select the color for the car. The user interface generation module 375 ranks the various values, i.e., colors based on the score. The user interface generation module 375 selects the top few values based on the ranking. The user interface generation module 375 orders the selected values based on the scores, for example, to present a higher ranked value above a lower ranked value. The user interface generation module 375 configures the widget, for example, a drop down list to show the selects list of values in the ranked order and presents the widget via the user interface 210.

According to an embodiment, the feature aggregation module 350 is used instead of or in conjunction with the machine learning models 140 to provide scores, binaries, or classifiers that indicate predicted user preferences for variations of customizable or configurable components of a physical object. The feature aggregation module 350 uses a weighted aggregate of values related to user features, or a similar rule, to determine user preferences. The weights or rules applied to different feature values from the feature store 330 are assigned by experts or may be based on historical data.

The content generation module 160 produces content including images or videos of a physical object in an optimal configuration, and interactive customization interfaces, according to predicted user preferences. In an embodiment, the content generation module 160 automatically generates content based on the metadata 150 produced by the machine learning models 140. In one embodiment, the content generation module comprises a tool (e.g. a computer program) used by an expert who is guided by the metadata 150 to design custom interfaces for a user.

The web server 355 links the online system 100 via the network 107 to the one or more client devices 105, as well as to the one or more third party systems 115. The web server 355 serves web pages, as well as other content, such as JAVA®, FLASH®, XML and so forth. The web server 355 may receive and route messages between the online system 100 and the client device 105, for example, instant messages, queued messages (e.g., email), text messages, short message service (SMS) messages, or messages sent using any other suitable messaging technique. A user may send a request to the web server 355 to upload information (e.g., images or videos) that are stored in the content store 360. Additionally, the web server 355 may provide application programming interface (API) functionality to send data directly to native client device operating systems, such as IOS®, ANDROID™, WEBOS® or BlackberryOS.

Overall Process

Figure 4:
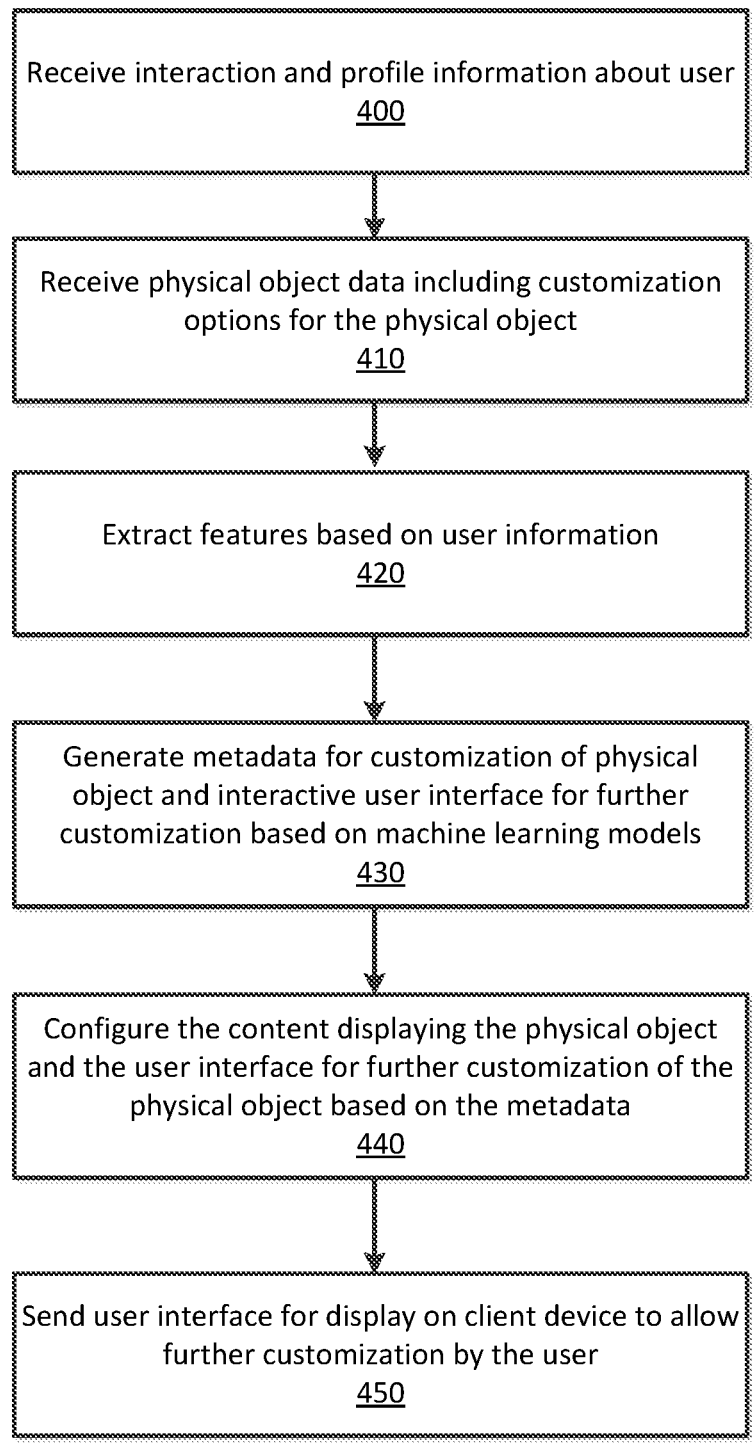
FIG. 4 is a flowchart illustrating the process of creating content related to a customizable physical object according to user preferences, in accordance with an embodiment.

FIG. 4 is a flowchart illustrating the process of creating content related to a customizable physical object according to user preferences, in accordance with an embodiment. The steps illustrated in FIG. 4 may be executed in an order different from that indicated in FIG. 4. Furthermore, the steps may be executed by modules different from the modules indicated herein.

The online system 100 receives 400 information about a user comprising user interactions with the online system 100 and profile information about the user. According to an embodiment, the information received by the online system 100 further comprises information about the user's connections with other users or other entities on the online system 100.

The online system 100 additionally receives 410 data about a physical object or objects. The data about the physical object includes available variations, customizations, and configurations of the physical object.

The online system 100 extracts 420 features that summarize user information. The features are extracted by the feature extraction module 325 from sources including the connection store 320, the user profile store 130, and the user interaction manager 110. According to an embodiment, these features may include life stage, interests, income, occupation, average commute, lifestyle, location, and tendency toward luxury goods.

The online system 100 generates 430 metadata 150 for customizing images of the physical object and interactive user interfaces according to predicted user preferences. The metadata 150 comprises scores, values, or binaries that indicate user preferences for particular configurations or variations of configurable or customizable components of the physical object. The user preferences are predicted by the machine learning models 140 and based on user data that has been extracted by the feature extraction module 325 and that has been subsequently stored in the feature store 330, according to an embodiment. In some embodiments, the feature aggregation module 350 is used instead of or in conjunction with the machine learning models 140 to create metadata 150 that describes predicted user preferences regarding configurations and customizations of the physical object.

The online system 100 configures 440 content for displaying the physical object and for displaying an interactive user interface through which the user can further customize the physical object. According to an embodiment, both of these interfaces are designed to appeal to predicted user preferences for certain configurations and customizations of the physical object, those preferences having been reported in the metadata 150. The content may be configured automatically, as by a computer system, according to values in the metadata 150. In an embodiment, the online system 100 stores several content items, each presenting a customizable physical object with a specific combination of customizable components or features. The online system 100 receives metadata describing the customizable physical object for a user as determined based on the predictions of the machine learning model 140. The online system 100 identifies a stored content item that represents the best match with the received metadata and returns the identified content item as the content item to be presented via the interactive user interface. According to one embodiment, the content is instead configured by an expert with access to the metadata 150, or by an expert using a tool, such as a computer program, that can aid in integrating information from the metadata 150 into the content.

The online system 100 configures and sends 450 user interfaces, some of which allow further customization of the customizable physical object by the user, for display via the client device 105. In conjunction with content configured according to predicted user preferences, the user interaction manager 110 receives metadata describing values of customizable features and components of the customizable physical object for configuring user interfaces to display the content. The user interaction manager handles logistics related to displaying the content to the user on the client device 105.

Generating and Using User Preference Models

Figure 5:
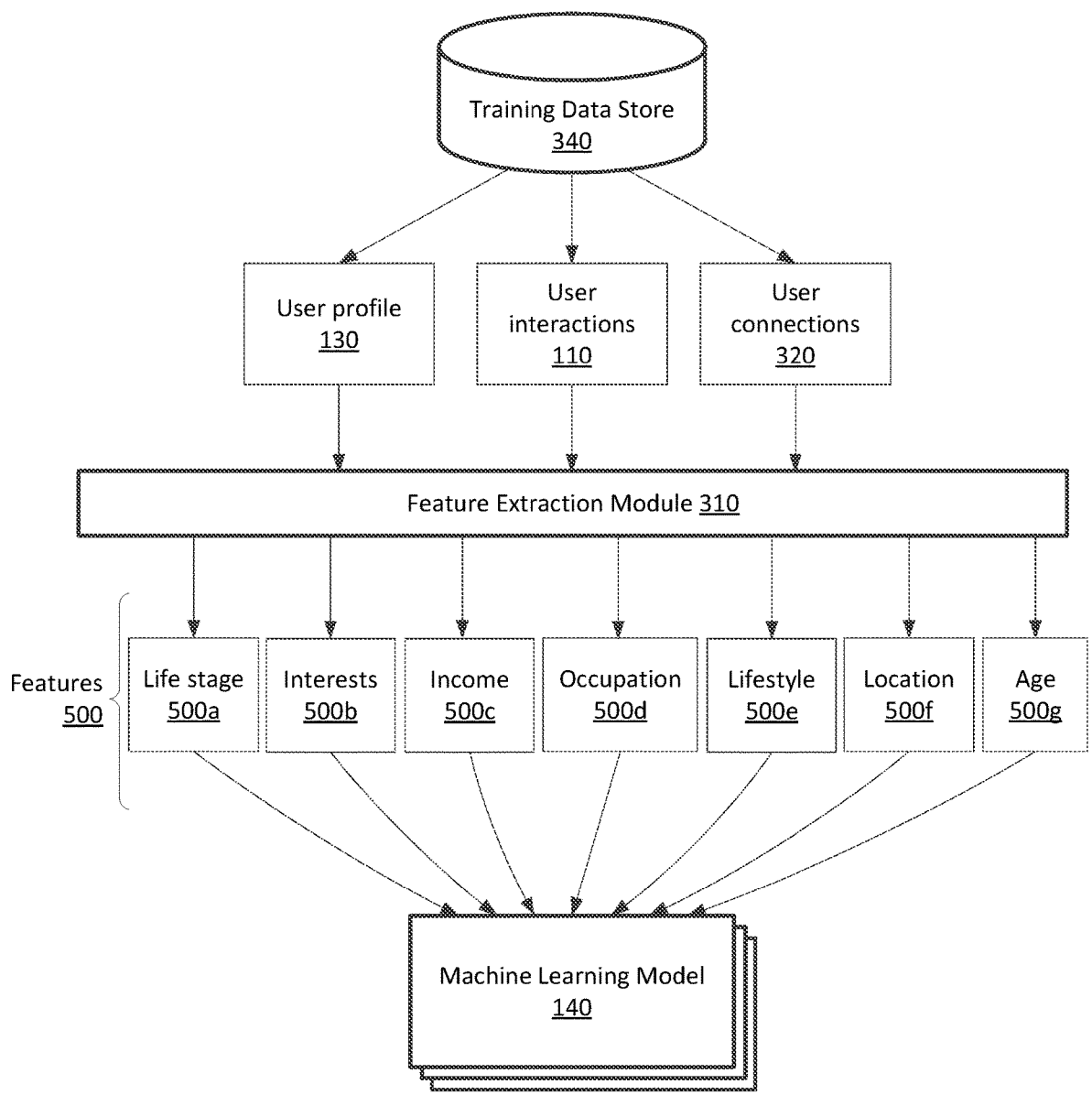
FIG. 5 is a data flow diagram illustrating the interactions between various types of data stored in an online system for training models to identify user preferences in relation to customizable characteristics of physical objects, in accordance with an embodiment.

FIG. 5 shows a data flow diagram illustrating the interactions between various types of data stored in the online system 100 for training models to identify user preferences in relation to customizable characteristics of physical objects, in accordance with an embodiment. The machine learning models 140 are trained to choose values, binaries, or other classifiers that indicate predicted user preferences for whichever customizable component of the physical object each model corresponds to.

The machine learning models 140 are trained using data stored in the training data store 340. The information used for training the models 140 comprises user profile data 130, user interactions data 110, and user connections data 320. The information in the training data store 340 comprises data that has been specially chosen or previously labeled such that it can inform the model.

A feature extraction module 325 extracts relevant features 500 from training data that is similar to the user profile data in the user profile store 130, the connection store 320, and the user interaction manager 110. For example, the feature extractor 310 might extract information about a user's life stage 500$a$, interests 500$b$, income 500$c$, occupation 500$d$, lifestyle 500$e$, location 500$f$, and age 500$g$.

The extracted features 500 are provided to the machine learning models 140 in order to train them. The machine learning models 140 use the features 500 to determine how to classify, evaluate, or otherwise provide preference scores of newly introduced users. According to an embodiment, a separate model is trained to identify a user's preferences with respect to each customizable or configurable feature of the physical object.

Figure 6:
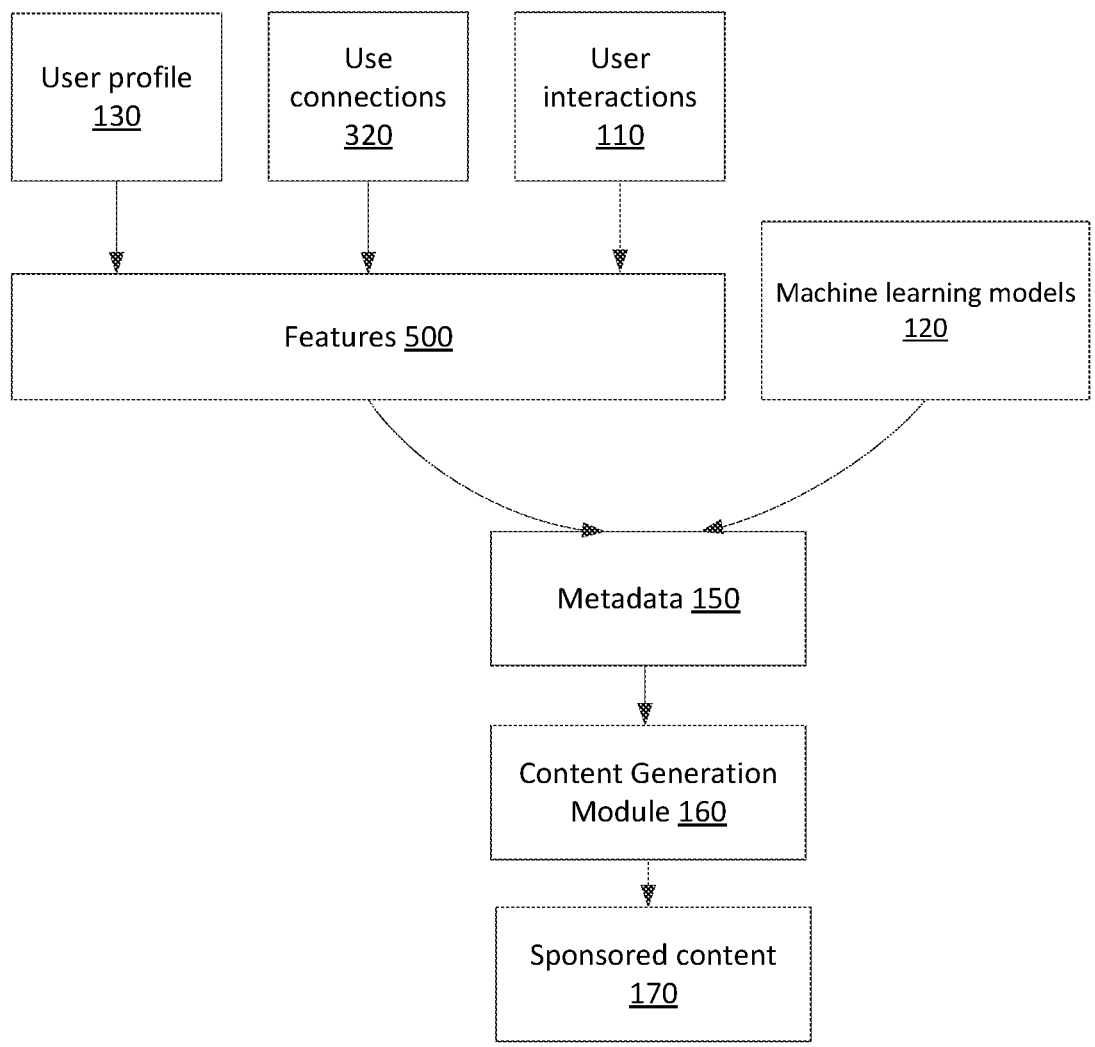
FIG. 6 is a data flow diagram illustrating the interactions between various types of data stored in an online system for developing content about a physical object according to user preferences, in accordance with an embodiment.

FIG. 6 shows a data flow diagram illustrating the interactions between various types of data stored in the online system 100 for classifying, evaluating, or otherwise scoring users based on their predicted preferences for certain configurations or customization options of configurable and customizable components of the physical object, according to an embodiment. FIG. 6 demonstrates one way in which the machine learning models 140 may be used to generate sponsored content 170.

A user profile 130, user connections 320, and user interactions 110 are used to extrapolate a set of relevant features 500, according to an embodiment. The machine learning models 140 for each customizable or configurable component that is to be included in the content, having been trained using similar feature sets, are applied to the features 500. Classifications, binaries, or other scores, based on the features 500, are determined by the machine learning models 140, according to some embodiments. In one embodiment, a machine learning model 140 determines a classification, binary, or score indicating the predicted user preference for every configurable or customizable attribute of the physical object. The metadata 150 comprises a resulting set of scores, classifications, and binaries.

The content generation module 160 uses the metadata 150 to design the sponsored content 170. The sponsored content 170 comprises information about how to display an interactive customization interface such that customization options that are predicted to appeal to user preferences will appear initially or in optimal positions on the user interface. The sponsored content 170 further comprises information about how to display the physical object in a configuration that will most appeal to predicted user preferences.

Customization of Intangible Items

In some embodiments, the techniques disclosed herein are used for customization of intangible items rather than physical objects. For example, a customizable item may represent a service offered by a business, vacation plans, financial packages, spa days, etc. The machine learning model 140 is trained using a training data set that is specific to the type of item being customized. In particular, the training module 365 trains a model for customizing a specific type of item using past interactions with content items presenting an item of the same type. In an embodiment, different item types are classified into categories such that past interactions with content items describing items of all types belonging to a category are used for training of a model. In an embodiment, similar features are used for determining the customizable features and for customization of the interactive user interface for similar item types, for example, item types of the same category.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, by an online system, social information comprising information describing a user and information describing one or more other users connected to the user via the online system;
    receiving information describing a customizable physical object, the customizable physical object comprising a plurality of customizable components, wherein each customizable component is associated with a plurality of values;
    for each of the plurality of customizable components of the customizable physical object:
        determining, by applying a different one of a plurality of trained machine learning models to each respective customizable component of the plurality of customizable components and based on the social information, a score of each of the plurality of values associated with the respective customizable components indicative of a likelihood of the user being interested in customizing the respective customizable components;
    selecting a subset of the plurality of customizable components to display to the user for customization, the selection based on the scores indicative of likelihoods of the user being interested in customizing the subset of the plurality of customizable components;
    generating a content item displaying the customizable physical object and an interactive user interface displaying the plurality of values for each customizable component in the subset of the plurality of customizable components, the plurality of values being displayed in order of the scores indicative of the likelihood of the user being interested in customizing the subset of the plurality of customizable components according to the values, such that each of the subset of customizable components is customizable according to the plurality of values; and
    sending, to a client device, the content item for display.

2. The computer-implemented method of claim 1, further comprising:
    configuring an interactive user interface for further customizing the customizable physical object, the interactive user interface comprising the generated content item and one or more widgets, each widget for customizing one of the selected subset of the plurality of customizable components of the customizable physical object; and
    sending the configured interactive user interface for display via the client device.

3. The computer-implemented method of claim 2, further comprising:
    sending, to the client device, data for displaying one or more options to further customize the physical object, the one or more options selected based on the social information.

4. The computer-implemented method of claim 2, wherein configuring the interactive user interface comprises configuring the interactive user interface for displaying a first widget for configuring a first customizable component more prominently compared to a second widget for configuring a second customizable component in an instance in which the scores of the first customizable component and the second customizable component indicate that the user is likely to be more interested in customizing the first customizable component compared to the second customizable component.

5. The computer-implemented method of claim 4, wherein configuring the interactive user interface for displaying the first widget more prominently compared to the second widget comprises configuring the interactive user interface for displaying the first widget on a first screen presented to a user before displaying the second widget.

6. The computer-implemented method of claim 2, wherein a customizable component is associated with a plurality of values, the method further comprising:
    ranking the plurality of values based on a likelihood of the user being interested in the customizable physical object with the customizable component; and
    configuring the one or more widgets to display the plurality of values based on the ranking.

7. The computer-implemented method of claim 6, wherein configuring the one or more widgets to display the plurality of values based on the ranking comprises:
    selecting a subset of the plurality of values and configuring the one or more widgets to display the subset of the plurality of values.

8. The computer-implemented method of claim 6, wherein configuring the one or more widgets to display the plurality of values based on the ranking comprises:
configuring the one or more widgets to display at least a subset of the plurality of values in an order determined based on the ranking.

9. The computer-implemented method of claim 1, wherein the trained machine learning models determine a score of each of the values using user information from profile data, and the user information comprising one or more of the user's life stage, occupation, or ethnicity.

10. A system comprising:
a processor; and
a non-transitory computer-readable memory comprising instructions that when executed by the processor cause:
receiving, by an online system, social information comprising information describing a user and information describing one or more other users connected to the user via the online system;
receiving information describing a customizable physical object, the customizable physical object comprising a plurality of customizable components, wherein each customizable component is associated with a plurality of values;
for each of the plurality of customizable components of the customizable physical object:
determining, by applying a different one of a plurality of trained machine learning models to each respective customizable component of the plurality of customizable components and based on the social information, a score of each of the plurality of values associated with the respective customizable components indicative of a likelihood of the user being interested in customizing the respective customizable components;
selecting a subset of the plurality of customizable components to display to the user for customization, the selection based on the scores indicative of likelihoods of the user being interested in customizing the subset of the plurality of customizable components;
generating a content item displaying the customizable physical object and an interactive user interface displaying the plurality of values for each customizable component in the subset of the plurality of customizable components, the plurality of values being displayed in order of the scores indicative of the likelihood of the user being interested in customizing the subset of the plurality of customizable components according to the values, such that each of the subset of customizable components is customizable according to the plurality of values; and
sending, to a client device, the content item for display.

11. The system of claim 10, wherein the instructions, when executed by the processor, further cause:
configuring an interactive user interface for further customizing the customizable physical object, the interactive user interface comprising the generated content item and one or more widgets, each widget for customizing one of the selected subset of the plurality of customizable components of the customizable physical object; and
sending the configured interactive user interface for display via the client device.

12. The system of claim 11, wherein the instructions, when executed by the processor, further cause:
sending, to the client device, data for displaying one or more options to further customize the physical object, the one or more options selected based on the social information.

13. The system of claim 11, wherein configuring the interactive user interface comprises displaying a first widget for configuring a first customizable component more prominently compared to a second widget for configuring a second customizable component in an instance in which the scores of the first customizable component and the second customizable component indicate that the user is likely to be more interested in customizing the first customizable component compared to the second customizable component.

14. The system of claim 11, wherein a customizable component is associated with a plurality of values, and the instructions, when executed by the processor, further cause:
ranking the plurality of values based on a likelihood of the user being interested in the customizable physical object with the customizable component; and
configuring the one or more widgets to display the plurality of values based on the ranking.

15. The system of claim 14, wherein configuring the one or more widgets to display the plurality of values based on the ranking comprises:
selecting a subset of the plurality of values and configuring the one or more widgets to display the subset of the plurality of values.

16. The system of claim 14, wherein configuring the one or more widgets to display the plurality of values based on the ranking comprises:
configuring the one or more widgets to display at least a subset of the plurality of values in an order determined based on the ranking.

17. A non-transitory computer readable storage medium comprising stored instructions for:
receiving, by an online system, social information comprising information describing a user and information describing one or more other users connected to the user via the online system;
receiving information describing a customizable physical object, the customizable physical object comprising a plurality of customizable components, wherein each customizable component is associated with a plurality of values;
for each of the plurality of customizable components of the customizable physical object:
determining, by applying a different one of a plurality of trained machine learning models to each respective customizable component of the plurality of customizable components and based on the social information, a score of each of the plurality of values associated with the respective customizable components indicative of a likelihood of the user being interested in customizing the respective customizable components;
selecting a subset of the plurality of customizable components to display to the user for customization, the selection based on the scores indicative of likelihoods of the user being interested in customizing the subset of the plurality of customizable components;
generating a content item displaying the customizable physical object and an interactive user interface displaying the plurality of values for each customizable component in the subset of the plurality of customizable components, the plurality of values being displayed in order of the scores indicative of the likelihood of the user being interested in customizing the subset of the plurality of customizable components according to the values, such that each of the subset of customizable components is customizable according to the plurality of values; and sending, to a client device, the content item for display.

18. The non-transitory computer readable storage medium of claim 17, wherein the stored instructions are further for:

configuring an interactive user interface for further customizing the customizable physical object, the interactive user interface comprising the generated content item and one or more widgets, each widget for customizing one of the selected subset of the plurality of customizable components of the customizable physical object; and sending the configured interactive user interface for display via the client device.

19. The computer-implemented method of claim 4, wherein configuring the interactive user interface for displaying the first widget more prominently compared to the second widget comprises configuring the interactive user interface for displaying the first widget above the second widget.

20. The system of claim 13, wherein configuring the interactive user interface for displaying the first widget more prominently compared to the second widget comprises configuring the interactive user interface for displaying the first widget on a first screen presented to a user before displaying the second widget.

\* \* \* \* \*